Aug. 16, 1966  J. A. MULLINS  3,266,245
AIRCRAFT
Filed April 21, 1964  2 Sheets-Sheet 1
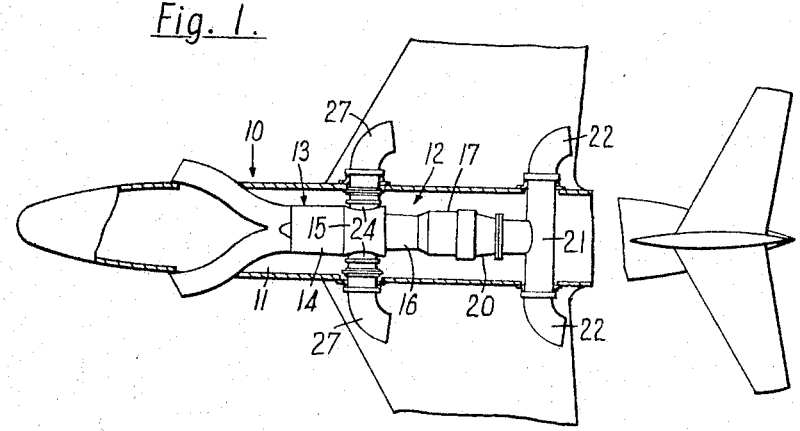
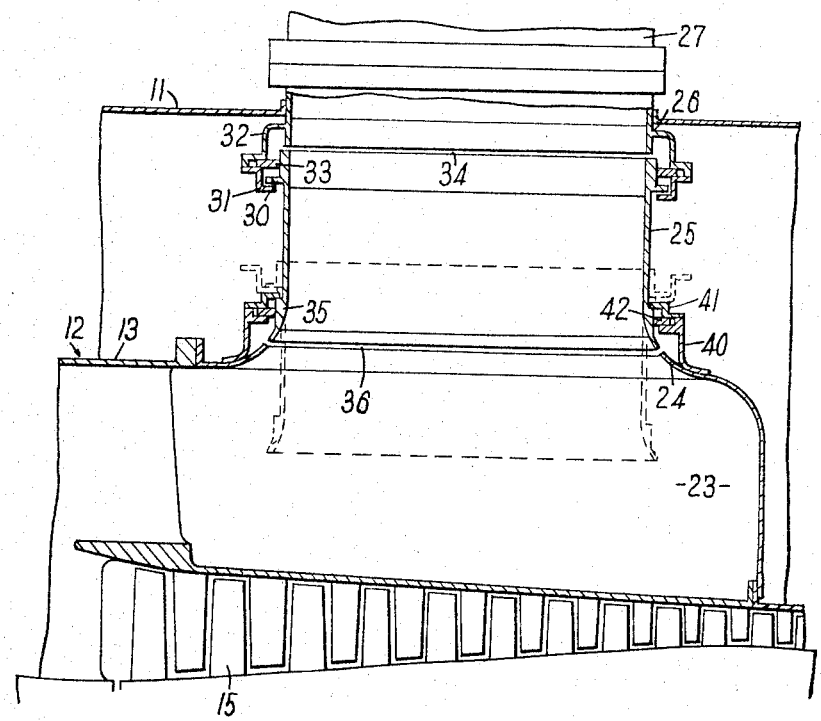

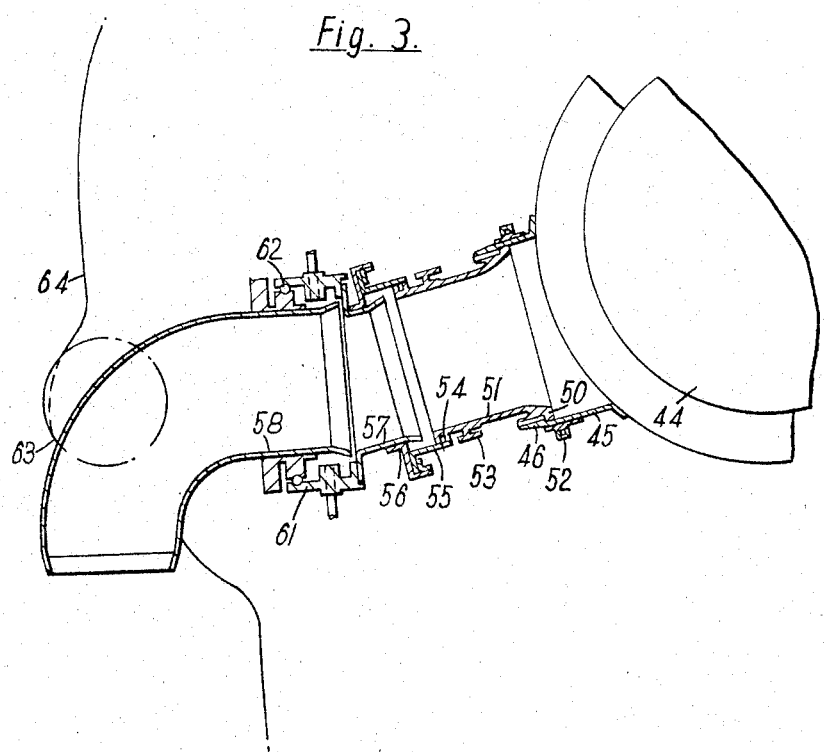

United States Patent Office 3,266,245
Patented August 16, 1966

3,266,245
AIRCRAFT
John Albert Mullins, Darley Abbey, Derby, England, assignor to Rolls-Royce Limited, Derby, England, a company of Great Britain
Filed Apr. 21, 1964, Ser. No. 361,512
Claims priority, application Great Britain, Apr. 25, 1963, 16,418/63
9 Claims. (Cl. 60—35.55)

This invention concerns an aircraft.

According to the present invention, there is provided an aircraft provided with a gas turbine jet engine, a rotatable jet nozzle which is spaced from said engine and is rotatable in bearings mounted in the aircraft structure, and a tubular connector member which is connected both to the nozzle and to a duct being arranged to receive a stream of gases from the engine.

Preferably means are provided for detachably securing the connector member to its nozzle and to its said duct so as to permit relative sliding movement between them on relative expansion and contraction, or on relative movement between the engine and the aircraft srtucture.

Preferably the last-mentioned means provide gas-tight seals between the connector member and the nozzle and/or between the connector member and the said duct.

It will be appreciated that, in the case of the present invention, the gas turbine engine may be easily installed in the aircraft and may easily be removed therefrom, e.g. for maintenance purposes.

Preferably the connector member is provided with abutment means which are engageable with abutment means on the said duct to prevent the connector member from being accidentally separated from said duct. Thus the abutment means on the connector member may be constituted by an external flange adjacent one end of the connector member and a shoulder adjacent the other end of the connector member.

The said external flange on the connector member may be disposed within a first annular member which is bolted to a second annular member which is itself secured to, or formed integrally with the nozzle, a sealing ring which engages the connector member being secured in position between the first and second annular members, the connector member being separated from its nozzle by a gap.

The connector member may be spaced from its said duct by a gap, each said duct being provided with a sealing ring which engages said shoulder.

Preferably there are two said nozzles which are arranged on opposite sides of the engine and each of which is arranged to receive air which has been compressed in the engine compressor.

Conduit means are preferably provided for passing the turbine exhaust gases to two nozzles which are arranged on the aircraft structure and are disposed on opposite sides of the engine, the conduit means being detachably secured to the engine jet pipe. Preferably each of the said nozzles which receives the turbine exaust gases is movable to vary the direction of thrust which may be exerted on the said aircraft by the gases passing through the respective nozzle.

The invention is illustrated, merely by way of example, in the accompanying drawings, in which:

FIGURE 1 is a broken away plan view, partly in section, of an aircraft according to the present invention, FIGURE 2 is a broken away section illustrating part of the structure of FIG. 1, and FIGURE 3 is a broken away section illustrating an alternative embodiment of the invention.

Referring to the drawings, an aircraft 10 which is adapted for vertical take-off and landing, has a fuselage 11 within which is mounted a gas turbine engine 12.

The engine 12 has an engine casing 13 within which there are mounted in flow series a low pressure compressor 14, a high pressure compressor 15, combustion equipment 16, and high and low pressure turbines 17. The turbine exhaust gases pass to an engine jet pipe 20 which is bolted (or otherwise detachably secured) to a T-shaped conduit 21.

The jet pipe 20, instead of being bolted to the conduit 21, may be provided at its downstream end with two V-shaped grooves in each of which is mounted a piston ring (not shown), the piston rings being mounted for sliding movement in the upstream end of the conduit 21.

The conduit 21 is provided with two nozzles 22 which are disposed on opposite sides of the engine 12 and which are secured to, and arranged at opposite sides of the fuselage 11.

Each of the nozzles 22 is rotatably mounted in bearings (not shown) mounted in the aircraft structure, each nozzle 22 being rotatable between positions in which the thrust of the jet gases passing through the nozzles 22 respectively causes forward propulsion, vertical take-off, and braking forces to be exerted on the aircraft.

Part of the air compressed in the low pressure compressor 14 may pass via an annular manifold 23 (FIG. 2) to two tubular ducts 24 which are respectively mounted on opposite sides of the engine 12. Each of the ducts 24 communicates by way of a tubular connector member 25 with a nozzle 26, 27.

The two nozzles 26, 27 have fixed parts 26, which are mounted on and secured to opposite sides of the fuselage 11, and rotatable parts 27 which are rotatably mounted in bearings (not shown) mounted in the fixed parts 26. The rotatable parts 27 are rotatable between positions in which the thrust of the compressed air passing through the parts 27 respectively causes forward propulsion, vertical take-off and braking forces to be exerted on the aircraft 10.

Each connector member 25 has an external flange 30 adjacent its outer end. Each flange 30 is disposed within an annular member 31 which is bolted to an annular member 32, the latter being formed integrally with the fixed part 26 of the respective nozzle 26, 27. A sealing ring 33 is secured in position between each pair of annular members 31, 32 and engages the respective connector member 25. Each connector member 25 is, in the assembled positon of the parts shown in full lines in FIG. 2, separated from the fixed part 26 of its respective nozzle 26, 27 by a gap 34.

Each connector member 25 is provided adjacent its inner end with a shoulder 35 which, in the assembled position of the parts shown in full lines in FIG. 2, is separated from the duct 24 by a gap 36. Each duct 24 is provided with a collar 40 which is secured to an annular member 41, a sealing ring 42 being retained between the collar 40 and member 41 and engaging the shoulder 35.

As will be appreciated, the construction described above provides gas-tight seals between each duct 24 and its connector member 25 and between the latter and its nozzle 26, 27, whilst permitting relative sliding movement between these parts on relative expansion and contraction and on relative movement between the engine 12 and the fuselage 11.

The engine 12 may readily be removed through a hole (not shown) in the fuselage 11, e.g. for maintenance purposes, merely by removing the bolts between the jet pipe 20 and the conduit 21, between the annular members 31, 32, and between the collar 40 and annular member 41. When this is done, each of the connector members 25 will move into the dotted line position shown in FIG. 2 in which the flnge 30, backed by its annular member 31, will abut the annular member 41 and so prevent the respective connector member 25 from falling into the manifold 23.

Similarly, the engine 12 may readily be fixed in position in the fuselage 11 merely by bolting together the jet pipe 20 and conduit 21, the annular members 31, 32, and the collar 40 and annular member 41. When each connector member 25 has been moved into the said full line position, its shoulder 35 will abut the annular member 41. This construction thus helps to prevent the connector member 25 from being accidentally separated from its duct 24.

In FIGURE 3 there is shown an alternative embodiment of the present invention in which a gas turbine jet engine 44 has a duct 45 which is adapted to receive air which has been compressed in the compressor (not shown) of the duct 45. The duct 45 has a shoulder 46 behind which is engaged a shoulder 50 on a tubular connector member 51.

The connector member 51 is secured to the duct 45 by a clamp ring 52 which may be slackened to permit the connector member 51 to be slid through the duct 45 towards the engine 44.

The connector member 51 has a flange 53 which is engageable against the shoulder 46 to prevent the connector member 51 from passing into the engine 44 when the clamp ring 52 is slackened.

The connector member 51 carries a seal 54 which is slidable within a sleeve 55. The sleeve 55 is bolted to, and may be unbolted from, a flange 56 of a fixed part 57 of a jet nozzle 57, 58.

The fixed part 57 is carried by and forms part of fixed structure 61 of an aircraft. The part 58 is rotatable in bearings 62 which are mounted in the fixed part 57.

The part 58, which is of elbow shape, extends through an aperture 63 in a streamlined facing 64 which forms part of the outer skin of the aircraft.

The part 58 may be rotated to provide forward, rearward and vertical thrust.

It will thus be appreciated that the thrust loads from the part 58 are transmitted through the bearing 62 to the fixed structure 61. This avoids the necessity of transmitting these heavy loads to the aircraft via the engine.

I claim:

1. An aircraft having aircraft structure, a gas turbine jet engine mounted within said structure, bearings mounted in said structure, a rotatable jet nozzle which is spaced from said engine and is rotatable in said bearings, a duct arranged to receive a stream of gases from the engine, and a tubular connector member which is detachably and slidably connected both to the nozzle and to said duct, the said connector member being connected to its nozzle and to its said duct to permit relative sliding movement between them on relative expansion and contraction, and on relative movement between the engine and the aircraft structure.

2. An aircraft as claimed in claim 1 in which there are gas-tight seals between the connector member and the nozzle and between the connector member and the said duct.

3. An aircraft having aircraft structure, a gas turbine jet engine mounted within said structure, bearings mounted in said structure, a rotatable jet nozzle which is spaced from said engine and is rotatable in said bearings, a duct arranged to receive a stream of gases from the engine, a tubular connector member which is connected both to the nozzle and to said duct, and mutually engageable abutment means on the connector member and on the said duct to prevent the connector member from being accidentally separated from said duct.

4. An aircraft as claimed in claim 3 in which the connector member has an external flange adjacent one end of the connector member and a shoulder adjacent the other end of the connector member.

5. An aircraft as claimed in claim 4 in which there are first and second annular members between which the said external flange on the connector member is disposed, the first annular member being bolted to the second annular member which is itself secured to the nozzle, a sealing ring engaging the connector member and being secured in position between the first and second annular members, the connector member being separated from its nozzle by a gap.

6. An aircraft as claimed in claim 4 in which the connector member is spaced from said duct by a gap, the said duct being provided with a sealing ring which engages said shoulder.

7. An aircraft having aircraft structure, a gas turbine jet engine mounted within said structure, first and second bearings arranged on opposite sides of the engine and mounted in said structure, rotatable jet nozzles which are spaced from said engine and which are respectively rotatable in said bearings, ducts arranged to receive streams of compressed air from the engine, and tubular connector members each of which is detachably and slidably connected both to a nozzle and to a duct.

8. An aircraft having aircraft structure, a gas turbine jet engine mounted within said structure, first and second bearings arranged on opposite sides of the engine and mounted in said structure, rotatable jet nozzles which are spaced from said engine and which are respectively rotatable in said bearings, ducts arranged to receive streams of turbine exhaust gases from the engine, and tubular connector members each of which is detachably and slidably connected both to a nozzle and to a duct.

9. An aircraft as claimed in claim 8 in which each of the said nozzles which receives the turbine exhaust gases is movable to vary the direction of thrust which may be exerted on the said aircraft by the gases passing through the respective nozzle.

References Cited by the Examiner

UNITED STATES PATENTS

| | | | |
|---|---|---|---|
| 2,580,207 | 12/1951 | Whittle | 60—35.6 |
| 2,612,402 | 9/1952 | Miscovich | 239—587 |
| 3,088,275 | 5/1963 | Marchant et al. | 244—52 X |
| 3,117,750 | 1/1964 | Snell | 244—52 X |
| 3,191,886 | 6/1965 | Lewis et al. | 60—35.55 X |

MARK NEWMAN, Primary Examiner.

C. R. CROYLE, Assistant Examiner.